Patented May 19, 1931

1,806,247

UNITED STATES PATENT OFFICE

FRITZ FRAUNBERGER AND GEORG KNÖFFLER, OF PREMNITZ, GERMANY

PROCESS FOR THE MANUFACTURE OF OXIDATION PRODUCTS OF SICCATIVE OILS

No Drawing. Application filed July 24, 1925, Serial No. 45,939, and in Germany August 11, 1924.

Although the oxidation of siccative oils and particularly of linseed oil is of great importance in the art yet a process has hitherto not been found which works absolutely satisfactorily. For instance, the so-called "Tucher" process usually adopted in the linoleum industry has the drawback that the oil is uselessly retained in the oxidation houses 3–4 months thereby resulting in a considerable economical loss. On the other hand, the blowing of drying oils, particularly of linseed oil (drum linoxyn process) does not yield products which are so thoroughly oxidized as according to the "Tucher" process for the simple reason that owing to the blowing, the oil becomes inspissated and finally solid (gelatinized) long before it has absorbed the necessary quantity of oxygen.

Owing to the fact that the oil becomes more difficultly movable (viscous), the surface of contact with regard to air and oxygen respectively is reduced by the inspissation of the oil. Finally owing to the solidification, the admission of the air bubbles in the interior of the oil is completely prevented so that the oxidation must come to a standstill.

It has been found that this premature inspissation or solidification of the oil can be obviated in that the oil to be oxidized is emulsified in a medium or agent which is capable of forming oil emulsions and the oil thus emulsified is subjected to the action of air or oxygen. Such media or agents are for instance, water and aqueous solutions and particularly aqueous solutions of emulsifying substances as, for instance, gum arabic, gelatine, glue and other agents which can emulsify oil in water. By these special additions of emulsifiers, the unexpected effect is attained that the oxidized oil drops are not converted into a consistent gelatine but while maintaining their form they are solidified into oxyn grains which are finer, the larger the quantity of emulsifier. The term "consistent gelatine" implies herein and to the experts in general a lumpy coherent rubber-like elastic mass which constitutes one large solidified drop of oil while when using special emulgators the small drops of oil do not cohere but solidify separately.

It is quite immaterial whether the air or the oxygen is blown into the upper part of the agitating drum wherein the liquid is contained in a fine spray or whether it is blown into the lower part (filled with liquid) of the agitating drum, with which in the case of a sufficiently strong air or gas current, an agitating effect is simultaneously combined.

The oxidation may be effected at all temperatures between 0° C. and 100° C., but preferably at temperatures between 40° C. and 80° C.

There is used for the oxidation in the first place linseed oil, also siccative oils in general. It is also obvious that for purely technical reasons such as saving of power and time, the oils may be oxidized not in a pure state but in the form of varnishes or at least with the addition of a siccative i. e. with the addition of cobalt, lead, manganese compounds or other ordinary accelerating agents.

*Example 1*

100 kilos linseed oil or commercial linseed oil varnish (the commercial linseed oil varnishes usually contain lead-manganese siccatives) are mixed with 300 liters water and 1.5 kilos gum arabic are added for emulsifying the oil in water. The mixture is subjected to the action of air or oxygen while simultaneously agitating or shaking the mixture. It is in fact only necessary to ventilate the vessel wherein the oxidation takes place so that the oxygen consumed by the oxidation process is replaced. It is fundamentally quite immaterial whether the fresh air or the oxygen is introduced in the air chamber above the liquid or whether it is blown into the liquid and perhaps even simultaneously used for agitation. The main thing is that a copious quantity of oxygen is always present. This however is obvious with regard to an oxidation process. After some time fine flakes (linoxyn) are formed which after interruption of the movement rapidly settle at the bottom. The linoxyn is easily obtained by removing the separated aqueous liquid in the known manner (for instance, by filtration).

*Example 2*

100 kilograms commercial lead-manganese varnish, 300 kilograms ethylene-glycol are oxidized at 45° C. with oxygen under simultaneous agitation. The linseed oil is converted under progressive oxidation into a rubber-like elastic mass, which is removed from the opened reaction vessel on the termination of the process and is washed out with water.

Having now particularly described and ascertained the nature of the said invention and in what manner the same is to be performed, we declare that what we claim is:

1. A process for the oxidation of siccative oils consisting in finely dispersing the oils in a liquid in which the oils are not soluble and of oxidizing the thus dispersed siccative oils by means of air.

2. A process for the oxidation of siccative oils consisting in finely dispersing the oils in the presence of an emulsifying agent in a liquid in which the oil is not soluble and oxidizing the thus dispersed oil by means of molecular oxygen.

3. A process for the oxidation of linseed oil consisting in finely dispersing the oil in water, treating the dispersion with air to oxidize the linseed oil and precipitate linoxyn and separating the linoxyn thus formed.

4. A process for the oxidation of linseed oil consisting in emulsifying the oil in a dilute aqueous gum arabic solution, treating this emulsion with air under constant agitation and separating the linoxyn formed by the oxidation of the linseed oil.

In testimony whereof we have signed our names to this specification.

DR. FRITZ FRAUNBERGER.
DR. GEORG KNÖFFLER.